United States Patent
Madhavapeddi et al.

(10) Patent No.: US 9,497,327 B2
(45) Date of Patent: Nov. 15, 2016

(54) VOICEMAIL PREVIEW AND EDITING SYSTEM

(71) Applicant: Nuance Communications, Inc., Burlington, MA (US)

(72) Inventors: Shreedhar Madhavapeddi, Seattle, WA (US); William F. Ganong, III, Brookline, MA (US); George Zavaliagkos, Lexington, MA (US); Uwe H. Jost, Maidenhead (GB); Gary B. Clayton, San Francisco, CA (US)

(73) Assignee: Nuance Communications, Inc., Burlington, MA (US)

( * ) Notice: Subject to any disclaimer, the term of this patent is extended or adjusted under 35 U.S.C. 154(b) by 46 days.

(21) Appl. No.: 14/569,484

(22) Filed: Dec. 12, 2014

(65) Prior Publication Data

US 2015/0098555 A1 Apr. 9, 2015

Related U.S. Application Data

(63) Continuation of application No. 13/101,909, filed on May 5, 2011, now Pat. No. 8,913,722.

(51) Int. Cl.
*H04M 1/64* (2006.01)
*H04M 3/533* (2006.01)
*G10L 15/26* (2006.01)

(52) U.S. Cl.
CPC .......... *H04M 3/53358* (2013.01); *G10L 15/26* (2013.01); *H04M 3/53366* (2013.01); *H04M 2201/40* (2013.01); *H04M 2203/4536* (2013.01); *H04M 2203/4554* (2013.01)

(58) Field of Classification Search
CPC .................. H04M 2201/40; H04M 1/271
USPC ....................................... 379/88.01
See application file for complete search history.

(56) References Cited

U.S. PATENT DOCUMENTS

| | | | | |
|---|---|---|---|---|
| 4,375,083 A | * | 2/1983 | Maxemchuk | G11B 27/028 345/440 |
| 6,507,643 B1 | * | 1/2003 | Groner | H04L 51/066 379/88.14 |
| 7,203,648 B1 | | 4/2007 | Ostermann et al. | |
| 8,139,726 B1 | * | 3/2012 | Zetterberg | H04M 3/42382 379/88.14 |
| 2009/0024389 A1 | * | 1/2009 | Khouri | G11B 27/036 704/235 |
| 2010/0177877 A1 | | 7/2010 | Hamaker et al. | |
| 2011/0216889 A1 | | 9/2011 | Howell et al. | |
| 2012/0022950 A1 | | 1/2012 | Gilbert et al. | |
| 2014/0003592 A1 | * | 1/2014 | Silver | H04M 1/57 379/142.02 |

\* cited by examiner

*Primary Examiner* — Simon King
(74) *Attorney, Agent, or Firm* — Perkins Coie LLP

(57) ABSTRACT

A voicemail computer system transcribes a voicemail message into text that is presented to a calling party for approval. A calling party is able to approve, disapprove or edit a voicemail message prior to delivery to one or more called parties. The voicemail computer system may analyze a voicemail message to detect errors, omissions, or potentially offensive words. The voicemail computer may analyze a voicemail message to make suggestions as to tone, content or information contained within the voicemail message. The calling party can edit the voicemail message or approve it prior to providing a notification to one or more called parties that they have received the voicemail message.

6 Claims, 4 Drawing Sheets

VOICEMAIL PREVIEW AND EDITING SYSTEM

CROSS-REFERENCE TO RELATED APPLICATION(S)

This application is a continuation of U.S. patent application Ser. No. 13/101,909, filed May 5, 2011, entitled "VOICEMAIL PREVIEW AND EDITING SYSTEM," which is incorporated herein by reference.

BACKGROUND

Since the widespread adoption of personal computers and the Internet, the use of formal methods of communication such as letter writing is rapidly declining and is being replaced with more informal communication methods such as electronic mail and voicemail. Electronic mail, while previously used for quick and informal message delivery, is now becoming the dominant form of business communication. As such, users treat e-mail communication with more care to make sure that such communications are appropriate for the receiver. In addition, systems are in place to keep records of e-mails that are sent and received. On the other hand, voicemail messages tend to be spontaneously composed and delivered. As a result, voicemail messages may contain misstatements or other factual errors and may not conform to a standardized message protocol. Furthermore, while records of voicemail messages can be stored by a receiving party, callers who leave voicemail messages often do not have a mechanism for keeping a record of voicemail messages that they leave for called parties.

DETAILED DESCRIPTION

A communication system in which a calling party is allowed to preview, edit, erase and/or store their voicemail messages is disclosed herein. In one embodiment, a voicemail computer system uses a speech-to-text converting program to transcribe audio voicemail messages into alphanumeric text. The calling party who leaves a message is sent a copy of a transcribed voicemail message for approval and/or editing. The transcribed voicemail message can be sent via e-mail, text message or via some other messaging protocol. Upon receipt, the calling party can review the voicemail message and make changes prior to delivery. If the calling party is happy with the voicemail message, the voicemail computer system delivers a notification to the intended recipient of the voicemail message. In addition, the calling party can save the transcribed voicemail in an electronic records system for archival or other purposes.

In some embodiments, the voicemail computer system stores a record of one or more facts for each calling party. The facts can be used to analyze the content and/or form of a voicemail message prior to delivery to a called party. In addition, the voicemail computer system can suggest additional information that can be included in a voicemail message prior to delivery to a called party.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Although the disclosed technology is described with respect to its currently preferred embodiments, those of ordinary skill in the art will recognize that changes can be made without departing from the scope of the disclosed technology. For example, in one embodiment, the technology is implemented by a programmed processor that executes steps that are described in a particular order. However, it will be appreciated that the steps could be performed in a different order or additional or alternative steps can be performed in order to achieve the functionality described.

Figure 1:
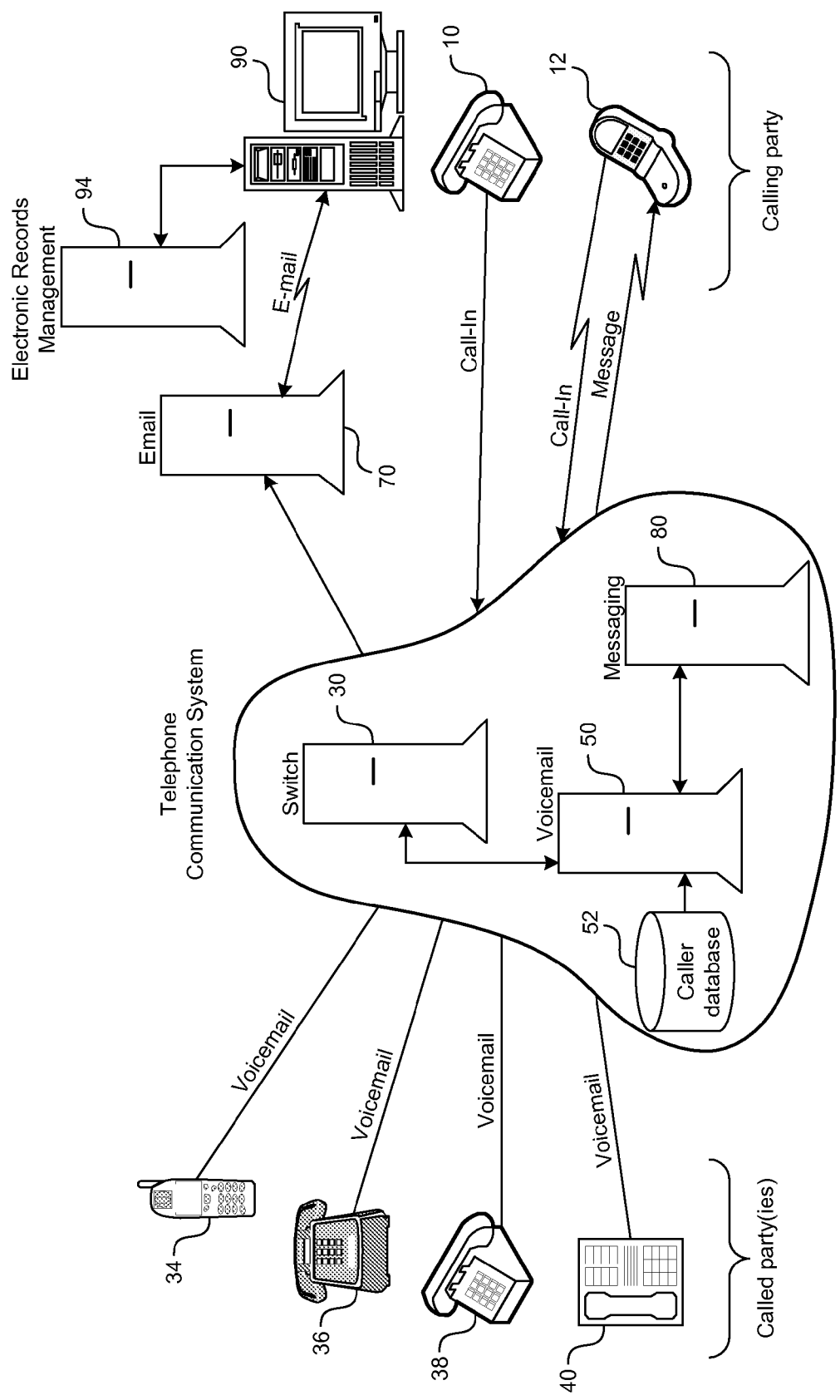
FIG. 1 illustrates a communication system in accordance with an embodiment of the disclosed technology.

FIG. 1 illustrates a representative telecommunication system in which a calling party can leave voicemail messages for one or more called parties. The calling party interacts with the telephone communication system via a landline telephone 10 or a mobile telephone 12. The mobile telephone 12 may be a mobile telephone or may comprise another type of computing device such as a personal digital assistant (PDA), fixed or mobile gaming device, portable music or video player, or another device with the appropriate hardware and software that allows a user to make telephone calls. Calls from the landline or mobile telephone may be carried on telephone wires, over the air such as via cellular or WIFI signals, or on computer communications links such as the Internet using voice over internet protocol (VoIP) systems or the like.

Calls placed by the calling party are routed through a telephone switching computer system 30 that might be part of the public switched telephone network (PSTN) or a mobile telephone communication network. Alternatively, the switching computer system 30 may be part of a server computer associated with VoIP communications. Upon receipt of a call, the switching computer system 30 routes the call to one or more called parties 34, 36, 38 and 40. If a called party answers the call, a communication link is established between the calling party and the intended called party. If, after a predetermined number of rings, the called party does not answer the call, then the call can be routed to a voicemail system 50. Alternatively, a call may be directly routed to a voicemail system in certain circumstances, such as if the called party cannot be reached, if the called party has indicated that calls should be routed to voicemail, or if network congestion or other factors prevent the call from being completed. In corporate environments where the calling party and the called party share the same telecommunications infrastructure, the calling party may also be able to directly connect with the voicemail system in order to record a voicemail that is intended to be delivered to the called party.

The voicemail computer system 50 can be part of the telephone communication system or can be operated by a third party provider such as Comverse, Inc. of Wakefield, Mass. Voicemail computer systems operate to perform tasks such as recording and storing voicemail messages left by the calling party for retrieval by one or more called parties. Typically, the voicemail computer system 50 provides an indication to a called party that they have a voicemail message waiting. The called party then uses their telephone, mobile communication device, or computer to access the voicemail message stored on the voicemail computer system 50.

As previously described, one problem with conventional voicemail systems is that the calling party does not have an opportunity to preview or edit voicemail messages before they are delivered to a called party. In a sense, the calling party loses control over their message as soon as they have recorded it. Furthermore, a calling party does not have a mechanism by which a record of a voicemail message can be stored and retrieved at a later date.

To provide calling parties greater control over voicemails that they generate, the voicemail computer system 50 implements a speech-to-text conversion program to transcribe a spoken voicemail message into a corresponding textual message. Upon transcription of an audio voicemail message to text, the voicemail computer system 50 presents the transcribed voicemail message to the calling party for approval. In one embodiment, the voicemail computer system 50 generates an e-mail message that is sent to an e-mail server 70 associated with the calling party. Alternatively, the voicemail computer system 50 can include the transcribed voicemail message in a text message that is transmitted to the calling party using a text messaging system 80. The message may be routed to the calling party using, for example, the telephone number of the calling party to identify the calling party. In another embodiment, the transcribed voicemail message may be posted on a web site that is accessible by the calling party to review and approve or edit the voicemail message. The web site may be secure so that a calling party can only see and edit their own messages.

The calling party reviews the transcribed voicemail message at a fixed or mobile computer system 90. Alternatively, the calling party may review the transcribed voicemail message on their mobile telephone or other mobile messaging device. After reviewing the transcribed voicemail, the calling party can approve the message or edit the message prior to delivery to a called party. Once the message is approved, the calling party can store a record of the message in an electronic records system.

Figure 2:
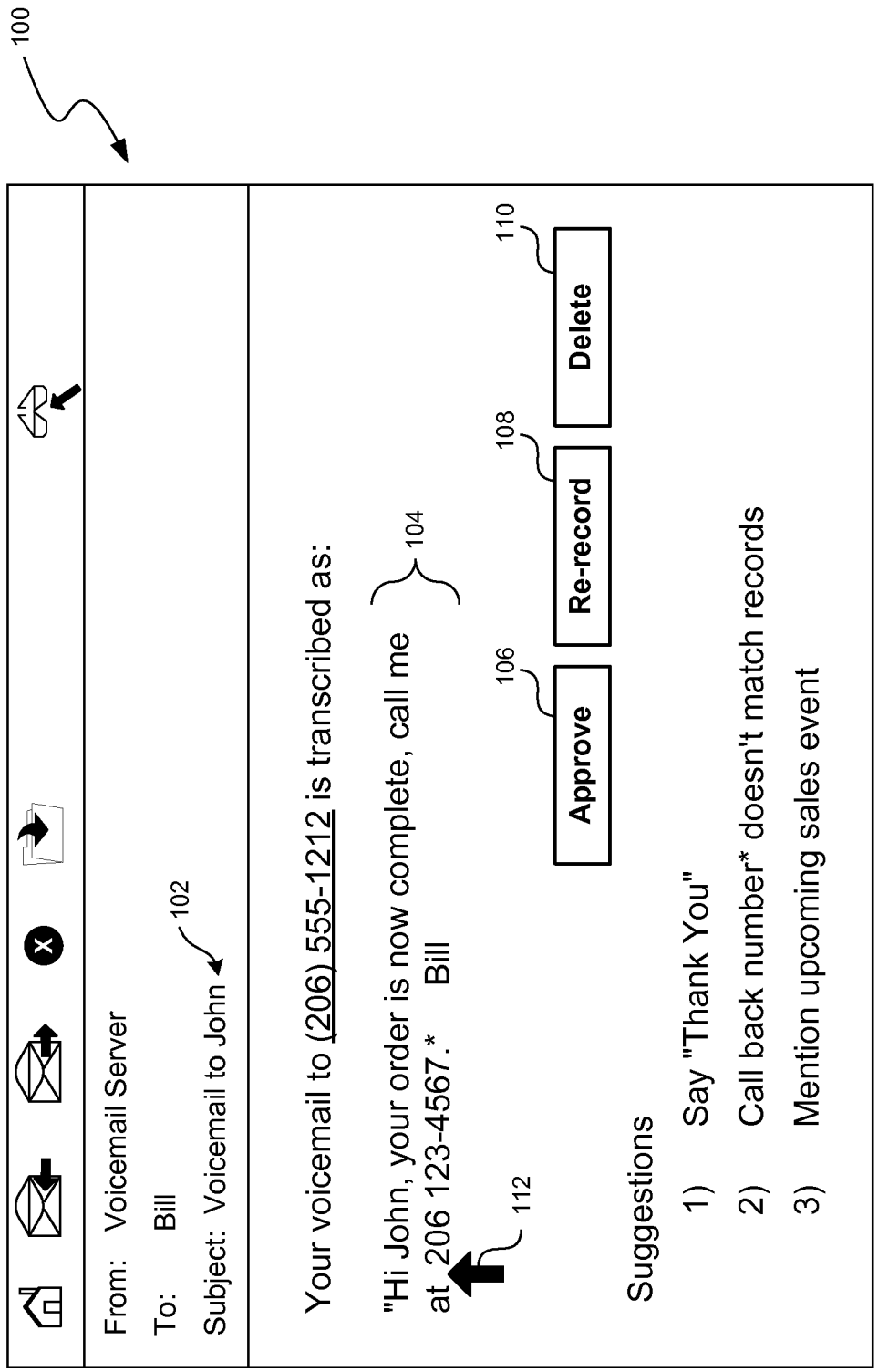
FIG. 2 illustrates a representative e-mail message showing a transcribed voicemail that is delivered to a calling party prior to delivery to a recipient.

FIG. 2 illustrates a representative example of a transcribed voicemail message that is generated by the voicemail computer system 50. In the depicted example, the voicemail has been transcribed and received by the calling party in the form of an e-mail 100. The e-mail 100 may include a subject line 102 that indicates the intended recipient of the voicemail message. Alternatively, the recipient may be determined based on an analysis of the transcribed voicemail. In cases where the name of the recipient cannot be identified, the intended recipient of the voicemail may be indicated by the recipient's phone number.

In the embodiment shown, the e-mail 100 includes a transcription 104 of the voicemail left by the calling party. Several controls 106, 108, 110 are provided in the e-mail 100 to allow the calling party to approve, re-record/edit, or delete the voicemail message. Upon receiving a selection of the "approve" control 106 by the calling party, the computing device on which the calling party views the e-mail transmits a message back to the voicemail computing system 50 to indicate that the voicemail is approved. Upon receiving an indication that the message has been approved, the voicemail computer system 50 provides an indication to a called party that they have received a voicemail. In addition, in accordance with embodiments of the disclosed technology, a record of the approved voicemail can be stored in an electronic records system 94 as shown in FIG. 1 in order to keep a record of messages left for particular individuals.

If the calling party selects the "re-record" control 108, the calling party is given an opportunity to re-record or edit their voicemail message prior to delivery. A calling party may interact with their computing device to place a cursor or indicator 112 within the text of the transcribed voicemail message. The position of the cursor 112 is correlated with the corresponding position in the audio voicemail message using a mapping of the transcribed text to the audio voicemail file. Once the calling party has identified the position to edit the voicemail, the calling party can dictate additional words that are to be added to the voicemail message. The newly-dictated words are sent to the voicemail computer system 50 where they are integrated with the audio voicemail file. The modified voicemail may then be re-transcribed and sent to the calling party to allow the calling party to verify the contents of the modified voicemail.

In addition to adding words, the calling party is able to select a word or words to be deleted or replaced. With the cursor or indicator 112, the calling party may be allowed to select a range of text which spans one or more words. The range of text may be specified by, for example, setting a location of a first cursor to start the selection and a second cursor to specify the end of the selection. Alternatively, the calling party may select and highlight a portion of text by selecting a starting location and moving a cursor over a segment of text as is common in graphical user interfaces. Once the calling party has selected a range of text, the calling party may be given the option to delete the identified range or modify the identified range. If the calling party opts to delete the identified range, the locations of the start and end of the range are correlated with the corresponding position in the audio voicemail message using a mapping of the transcribed text to the audio voicemail file. The correlated portion of the audio voicemail file may then be deleted and the remaining portions of the audio voicemail file joined together. If the calling party opts to modify the identified range, the calling party can dictate additional words that are to be added to the identified location in the voicemail message. The newly-dictated words are sent to the voicemail computer system 50 where they are integrated with the audio voicemail file. The integration is performed by deleting the identified range using a mapping of the transcribed text to the audio voicemail file, and replacing the identified range with the newly-dictated words that were received from the calling party.

If the calling party selects the "delete" control 110 to delete the entire voicemail, the voicemail computer system 50 operates to delete the voicemail message without delivering it to the called party.

In accordance with some embodiments of the disclosed technology, the voicemail computer system 50 maintains a database 52 that stores information associated with a number of calling parties. The database may store such information as the calling party's name, contact information (e.g., phone numbers) for the calling party, the company that the calling party works for, rules associated with the calling party's employer regarding how voicemail messages should be recorded, special events of the employer, promotions or other items of interest that may be applicable to the calling party's business or other information that is useful for analyzing voicemail messages prior to their delivery.

The voicemail computer system 50 may analyze a voicemail message that is left by the calling party and offer one or more suggestions to the calling party. In one embodiment, the calling party's identity is determined based on their phone number and the information associated with the calling party that is retrieved from the database 52. The information is used to analyze the content of the transcribed voicemail message prior to delivery. In the example shown in FIG. 2, the voicemail computer system 50 suggests that the words "thank you" be added to the voicemail message. In addition, the voicemail computer system has detected that the callback number left by the calling party does not match a number stored in the caller database 52 that is associated with the calling party. The calling party is therefore alerted that there may be a mistake in the voicemail message that the calling party can correct prior to delivery. Also in the example shown, the voicemail computer system may determine from the caller database 52 that the calling party's company has an upcoming sales event that could be mentioned in the voicemail message.

If the calling party decides to accept any of the suggestions offered by the voicemail computer system 50, the calling party can re-record or edit their voicemail message using the "re-record" control 108 in the e-mail. Alternatively, the calling party can access their previously stored voicemail on the voicemail computer system 50 through a computer communication link such as with a web browsing program, etc.

When editing a transcribed voicemail, it was previously suggested that the calling party would verbally re-record a portion of the voicemail which is then inserted at a specified location within the voicemail. In contrast to verbally re-recording a portion of the voicemail, in some embodiments the calling party can type or otherwise enter the text that is to be added to the voicemail at a particular location. The calling party's computer transmits the text and the location of the added text to the voicemail computer system 50, which finds the corresponding position in the recorded audio message. The voicemail computer system then uses a speech synthesizer to convert the edits into speech, and inserts the synthesized speech into the identified location of the voicemail.

Figure 3:
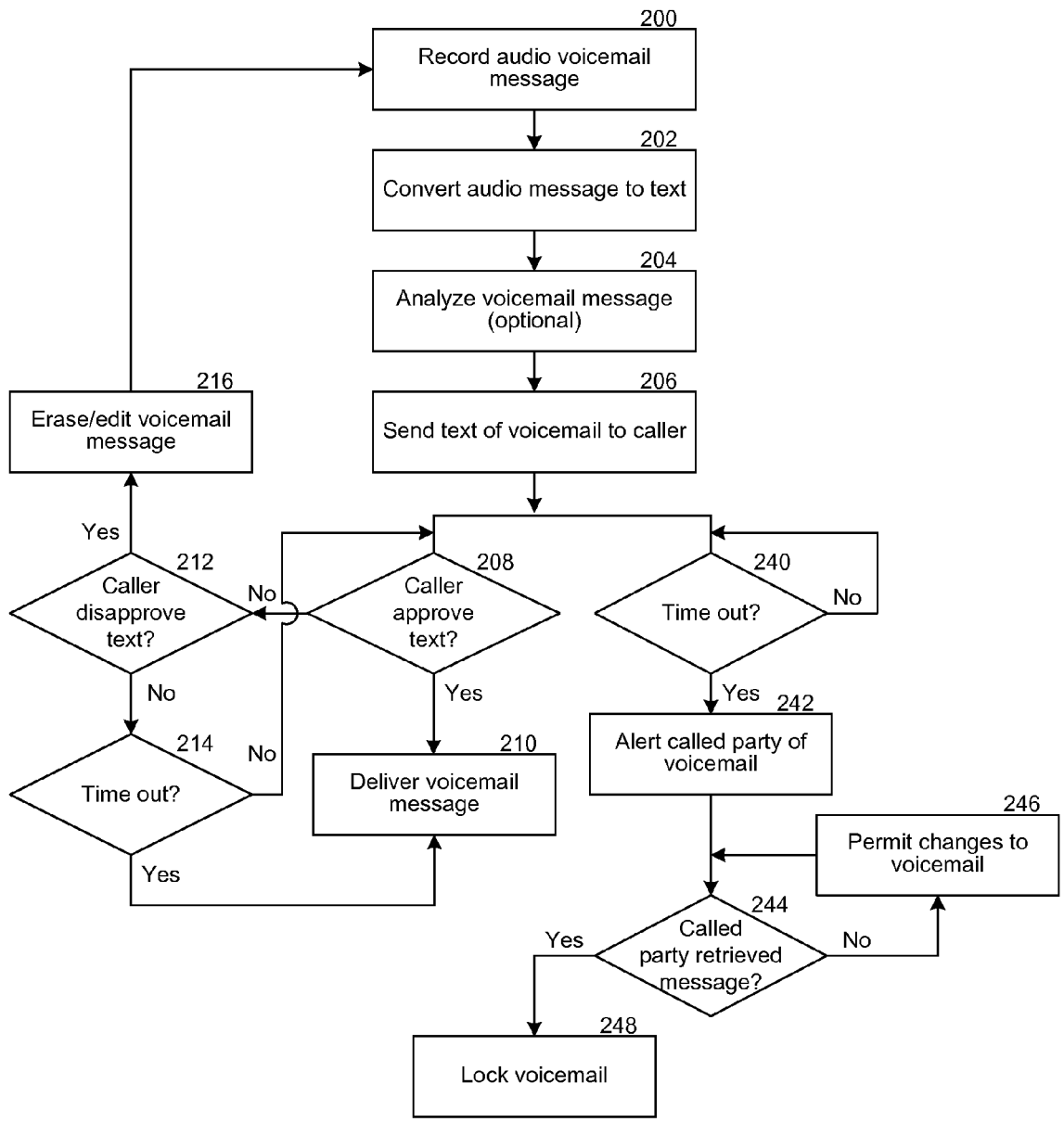
FIG. 3 is a flowchart of steps performed by a voicemail system to enable a calling party to approve, edit, or erase a voicemail that the calling party left for a recipient.

FIG. 3 illustrates a series of steps performed by a voicemail computer system 50 to enable a calling party to approve, edit, or erase a voicemail that the calling party left for a recipient. As will be appreciated by those skilled in the art, the voicemail computer system 50 includes one or more processors that execute a series of executable program instructions stored on a non-transitory computer readable media such as a hard drive, flash drive, CD-ROM or the like. Beginning at block 200, the voicemail computer system 50 records an audio voicemail message left by a calling party for one or more called parties. Once the audio message is recorded, the voicemail computer employs a speech-to-text conversion program to convert the audio voicemail message to a corresponding textual message. During the conversion process, a record is maintained by the voicemail computer system 50 that associates each transcribed word from the voicemail with a location in the corresponding audio file. As with any speech-to-text conversion program, the program can be trained to recognize words spoken by a caller. Training data associated with each caller can be stored in the caller database 52 for use in transcribing audio voicemail message left by the calling party.

At block 204, the voicemail computer 50 can optionally analyze a stored voicemail message for style or content using information stored for the calling party in the caller database 52. In the previous example, the voicemail computer system analyzes a transcribed voicemail message for a correct callback number. Alternatively, the voicemail computer system can utilize artificial intelligence techniques to analyze an audio voicemail message for the tone of the message, the use of inappropriate words such as curse words, slang, or the like in accordance with rules defined either by the calling party, their employer or using one or more sets of predefined rules that a calling party can select or approve. In addition, an analysis of a voicemail message can be performed to offer suggestions for alternative or additional language as well as for additional information that could be provided in the voicemail message.

At block 206, the voicemail computer system initiates the transmission of a message to the calling party that includes the text of the transcribed voicemail message. In addition, the message containing the transcribed message may include the results of any analysis performed at block 204.

There are numerous mechanisms by which the voicemail computer system can process the recorded voicemail message after a message including its transcription is sent to the calling party. In one embodiment, the calling party is required to approve the voicemail message before a notification is delivered to a called party that indicates they have received a voicemail message. In this embodiment, the voicemail computer system determines at block 208 whether the calling party has approved the text of the voicemail message. If so, a notification is delivered to a called party that they have received a voicemail message. If the calling party has not approved the text of the voicemail message at block 208, it is determined at block 212 whether the calling party has either disapproved of the text in its entirety or has edited the voicemail message as discussed above. If so, the voicemail system stores the edited voicemail message or can erase the entire voicemail message and allow the calling party to re-record their message at block 216. A new re-recorded voicemail message or the edited voicemail message can then be re-transcribed and sent to the calling party as discussed above or the new/edited message can be saved and an indication will be provided to a called party that they have received a voicemail message. At block 214, it is determined whether the calling party has approved or disapproved/edited the transcribed voicemail message within a predetermined amount of time. For example, the calling party may be given a certain amount of time, such as five minutes to approve the text after receiving the transcribed voicemail. At the end of five minutes, if the calling party has not approved or disapproved/edited the voicemail message, a notification of the voicemail message can be delivered to a called party.

In accordance with another embodiment of the disclosed technology, a notification can be delivered to a called party that they have received a message as soon as it is recorded or within a predetermined time period. For example, the voicemail computer system may wait two or three minutes at block 240 after a message is recorded before signaling to a called party that they have received a message at block 242. Next, the voicemail computer system determines if a called party has retrieved a message or if the calling party has modified the voicemail message. In one embodiment, once the voicemail computer system detects that a called party has retrieved the voicemail message, the message is effectively "locked" or prevented from further additions or alterations at block 248. If a called party has not yet retrieved its voicemail message, the voicemail computing system records any changes to the message at block 246 until such time as a called party retrieves the message. If more than one person is designated as a recipient of the voicemail message, the voicemail message is locked as soon as a first called party retrieves the message so that the voicemail message does not change among recipients. In another embodiment, the voicemail computer system can provide an indication to a calling party if a called party retrieves a voicemail message before the calling party has a chance to complete the editing process. The calling party may then be given the opportunity to send another voicemail message to the called party with the edits. In yet another embodiment, a called party may be given the option of retrieving the original voicemail message or the edited voicemail message or both.

In one embodiment, the called party is allowed to retrieve the audio voicemail message. In another embodiment, the voicemail computer system may send the transcribed voicemail message to a called party either as a substitute for the audio voicemail message or in addition to the audio voicemail message.

Figure 4:
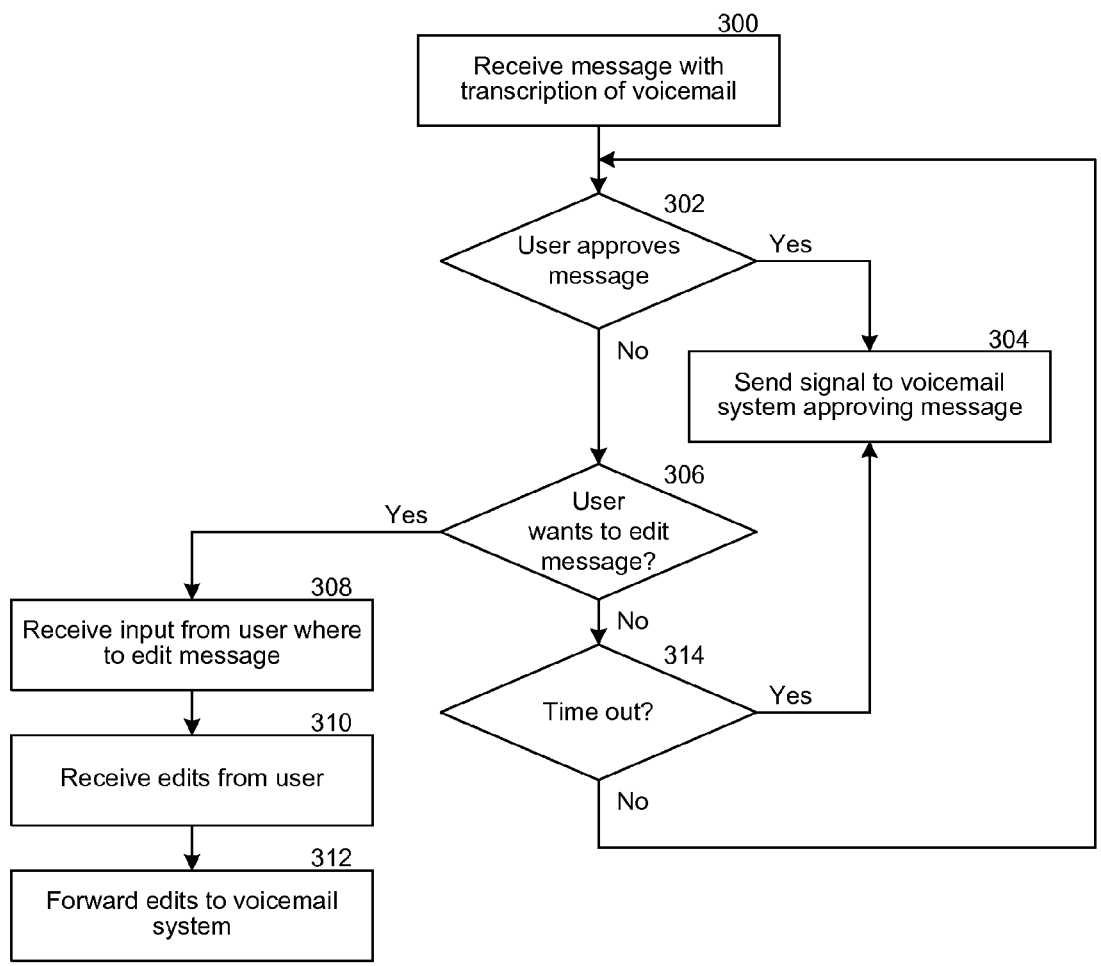
FIG. 4 is a flowchart of steps performed by a computing device associated with a calling party to enable the calling party to approve, edit, or erase a voicemail.

FIG. 4 illustrates a series of steps performed by a computer system that is associated with the calling party to approve or disapprove/edit a voicemail message prior to delivery to a called party. The computer system may be a separate computer associated with the calling party on which the calling party receives e-mail or other messages. Alternatively, the computer system may be incorporated into the telephone with which the calling party recorded the voicemail message such as in a cell phone or other mobile computing device.

At block 300, the computer system of the calling party receives a message with a transcription of a voicemail left by the calling party. The message received may be an e-mail, text message or in some other format. At block 302, the computer system determines if the calling party has approved the message. For example, the calling party may select one or more controls on a user interface of the computer to approve or disapprove/edit the voicemail message. If the calling party approves the voicemail message, then the computer system of the calling party sends a signal to the voicemail computer system approving the message at block 304. Such a signal may be sent via the Internet, via a text message, via return e-mail or using some other signaling format. If the calling party has not approved the voicemail message at block 302, the computer system determines whether the calling party has selected a control indicating the calling party wants to edit the voicemail message at block 306. If so, the computer system receives input from the calling party indicating where the calling party would like to edit the message at block 308. For example, the calling party may place a cursor within the transcription of the message to indicate where words should be added or deleted from the message. At block 310, the computer system receives edits from the calling party. The edits may be spoken or entered via a keyboard, stylus, touch screen or some other user control. At block 312, the edits are forwarded to the voicemail computer system to include in the voicemail message. In another embodiment, the calling party interacts with the voicemail computer system directly such as via a web page or by a telephone call, to edit the stored voicemail message.

If the calling party's computer does not receive an indication that the calling party either approves, disapproves or wants to edit the voicemail message at block 306, the computer system determines if a timeout has occurred at block 314. In one embodiment, calling parties are only given a limited amount of time to either approve or disapprove/edit a transcribed voicemail message. If the calling party does not act within a predetermined period of time, an indication is sent to the called party that they have received a voicemail message. If a timeout has not occurred, processing returns to block 302 until either the calling party approves the message, deletes/edits the message or a timeout occurs.

Once the calling party has approved, disapproved or edited the voicemail message, the calling party's computer can cause the transcribed voicemail message to be stored in an electronic records system such as a customer records management system to keep track of voicemail messages left for called parties.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on non-transitory computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "processor electronics" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a calling party, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

As will be appreciated, the technology disclosed herein allows a calling party to retain control over a voicemail message until either they are happy with it or it is retrieved by a called party. In addition, the calling party is able to retain a record of voicemail messages that they have left for called parties.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A voicemail system, comprising:
   a memory for storing executable program instructions; and
   processor electronics configured to execute the program instructions in order to:
      record an audio voicemail message from a calling party;
      transcribe the audio voicemail message to text;
      present the text of the audio voicemail message to the calling party with a number of controls that allow a calling party to accept, reject or edit the voicemail message and wherein the processor electronics is configured execute program instructions in order to provide a notification to two or more called parties who have received a voicemail message and to accept edits to the voicemail message by the calling party up to a time at which the voicemail system detects that one of the called party retrieves the voicemail message.

2. The voicemail system of claim 1 where the processor electronics is configured to execute program instructions to present the text of the voicemail message to the calling party by sending an e-mail message to the calling party.

3. The voicemail system of claim 1 where the processor electronics is configured to execute program instructions to present the text of the voicemail message to the calling party by sending a text message to the calling party.

4. The voicemail system of claim 1 where the processor electronics is configured to execute program instructions to present the text of the voicemail message to the calling party by posting the transcribed voicemail message on a web site that is accessible by the calling party.

5. A voicemail system, comprising:
a memory for storing executable program instructions; and
processor electronics configured to execute the program instructions in order to:
  record an audio voicemail message from a calling party to two or more called parties;
  provide an indication to the two or more called parties who have received a voicemail message;
  transcribe the audio voicemail message to text;
present the text of the audio voicemail message to the calling party with a number of controls that allow a calling party to accept, reject or edit the voicemail message and wherein the processor electronics is configured to execute program instructions to prevent the calling party from making changes to the voicemail message after a time at which one of the called party retrieves the voicemail message.

6. The voicemail system of claim 5, wherein the processor electronics is configured to:
retrieve information about the calling party from a database;
analyze the transcribed voicemail message using the retrieved information; and
produce one or more suggestions regarding the transcribed voicemail message to the calling party.

* * * * *